(12) United States Patent
Dunn et al.

(10) Patent No.: US 10,474,613 B1
(45) Date of Patent: *Nov. 12, 2019

(54) ONE-WAY DATA TRANSFER DEVICE WITH ONBOARD SYSTEM DETECTION

(71) Applicant: Fend, Inc., Arlington, VA (US)

(72) Inventors: Colin Patrick Dunn, Falls Church, VA (US); Sang Cheon Lee, Ashburn, VA (US)

(73) Assignee: Fend, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/508,532

(22) Filed: Jul. 11, 2019

Related U.S. Application Data

(63) Continuation-in-part of application No. 16/224,694, filed on Dec. 18, 2018, now Pat. No. 10,387,351.

(60) Provisional application No. 62/609,892, filed on Dec. 22, 2017.

(51) Int. Cl.
*G06F 13/40* (2006.01)
*H04W 8/20* (2009.01)
*G06F 9/54* (2006.01)
*H04L 29/06* (2006.01)
(Continued)

(52) U.S. Cl.
CPC .......... *G06F 13/4027* (2013.01); *G06F 9/544* (2013.01); *G06F 21/606* (2013.01); *H04L 63/0428* (2013.01); *H04W 8/20* (2013.01); *G06F 21/86* (2013.01); *G06F 2213/3808* (2013.01)

(58) Field of Classification Search
CPC . G06F 1/18; G06F 1/181; G06F 1/182; G06F 1/189; G06F 9/544; G06F 13/4027; G06F 13/4045; G06F 13/4068; G06F 13/4072; G06F 15/16; G06F 15/163; G06F 15/17; G06F 15/1735; G06F 21/60; G06F 21/602; G06F 21/606; G06F 21/62; G06F 21/6209; G06F 21/6218; G06F 21/6236; G06F 21/70; G06F 21/82; G06F 21/85; G06F 21/86; G06F 2213/3808; H04L 63/04; H04L 63/0428; H04W 8/20
See application file for complete search history.

(56) References Cited

U.S. PATENT DOCUMENTS

| 5,574,722 | A | 11/1996 | Slykhouse et al. |
| 5,703,562 | A | 12/1997 | Nilsen |
| 6,901,075 | B1 | 5/2005 | Baron |

(Continued)

FOREIGN PATENT DOCUMENTS

| EP | 3229439 A1 | 10/2017 |
| WO | 2014164976 A1 | 10/2014 |

OTHER PUBLICATIONS

"The Definitive Guide to Data Diode Technologies From Simple to State of the Art." Owl Cyber Defense Solutions, LLC, 2018.
(Continued)

*Primary Examiner* — Thomas J. Cleary
(74) *Attorney, Agent, or Firm* — Schafer IP Law

(57) ABSTRACT

A data diode provides a flexible device for collecting data from a data source and transmitting the data to a data destination using one-way data transmission. On-board processing elements allow the data diode to identify automatically the type of connectivity provided to the data diode and configure the data diode to handle the identified type of connectivity. Either or both of the inbound and outbound side of the data diode may comprise one or both of wired and wireless communication interfaces.

20 Claims, 6 Drawing Sheets

(51) Int. Cl.
G06F 21/60 (2013.01)
*G06F 21/86* (2013.01)

(56) References Cited

U.S. PATENT DOCUMENTS

| | | |
|---|---|---|
| 7,675,867 B1 | 3/2010 | Mraz et al. |
| 8,139,581 B1 | 3/2012 | Mraz et al. |
| 8,223,205 B2 | 7/2012 | Frenkel et al. |
| 9,264,288 B1 | 2/2016 | Arora et al. |
| 9,305,189 B2 | 4/2016 | Mraz et al. |
| 2005/0033990 A1 | 2/2005 | Harvey et al. |
| 2010/0211705 A1 | 8/2010 | Alcouffe et al. |
| 2010/0235561 A1 | 9/2010 | Goldring |
| 2010/0257353 A1 | 10/2010 | Cheng |
| 2010/0290476 A1 | 11/2010 | Brindle et al. |
| 2011/0153969 A1 | 6/2011 | Petrick |
| 2013/0117995 A1 | 5/2013 | Sullivan et al. |
| 2015/0039787 A1 | 2/2015 | Voorhees et al. |
| 2016/0294826 A1 | 10/2016 | Han et al. |
| 2017/0118123 A1 | 4/2017 | Ishii et al. |

OTHER PUBLICATIONS

Advenica AB. "SecuriCDS® DD1000i; Unidirectional data flow." Product Sheet, Doc. No. 17235v1.1. (2017).
Advenuca AB. "SecuriCDS® DD1000A; Unidirectional protection for Ethernet layer 2." Product Sheet, Doc. No. 17237v2.1 (2018).
International Search Report dated Feb. 13, 2019 in counterpart International Application No. PCT/2018/066328.

ONE-WAY DATA TRANSFER DEVICE WITH ONBOARD SYSTEM DETECTION

CROSS-REFERENCE TO RELATED APPLICATION

This application is a continuation-in-part of U.S. patent application Ser. No. 16/224,694, filed Dec. 18, 2018, which claims priority to U.S. Provisional Application No. 62/609,892 filed on Dec. 22, 2017, both of which are hereby incorporated herein by reference in their entirety.

TECHNICAL FIELD

The present invention relates to the field of security, and in particular to a compact network device that provides hardware enforced one-way data transfer from a protected data source.

BACKGROUND ART

Computer and network security is an area of considerable concern. While there is great interest in being able to remotely monitor resources such as industrial facilities across computer networks, lack of security of those monitored resources has required the development of specialized devices that provide defenses against security threats to computers, networks, and other devices in the monitored resources that go beyond the protection of firewalls and other traditional Internet security software and hardware systems. For high security resources, such as those used by government agencies and some commercial facilities, such as computer-controlled industrial facilities, energy, or water utilities, conventional firewall and other security systems may not provide reliable enough protection from undesired intrusions.

Today, we consider one single, high-value asset to be critical because to lose it would cause widespread disruption (for example: a power plant), but in aggregate, thousands of pieces of commercial equipment represent a similar threat and the number of attack vectors is exponentially higher. Widespread cyberattack of commercial or "subcritical" equipment, from building chillers to sewage pumps, would cause economic disruption and compromise public safety. For example, attacks on the air handlers in a region's hospital network, the refrigeration equipment at pharmacies and grocery stores, or the chilled water pumps serving Virginia's data centers could have severe impact.

For these types of resources, one-way data transfer may be a critical requirement to isolate the protected network from intrusion by malware or other malicious actors outside the protected network. While conventional Internet firewalls and software systems such as specially configured operating system may be designed to restrict data transfer to unidirectional data flow, software-based one-way data transfer systems are difficult to validate and verify, and may be subject to intentional or inadvertent misconfiguration that may allow data leakage or intrusions in the reverse direction.

Malicious attacks to date have focused largely on data theft or network disruption, but attacks on physical assets are becoming more frequent. Attackers can compromise IoT devices and, for example, (a) Recruit devices into botnets used for distributed denial of service (DDOS) attacks; (b) Open a back door into a corporate network; or (c) Change operating behavior of the device, leading to device failure or safety concerns.

Data diode devices have been developed to provide hardware-enforced one-way data transfer, using techniques as simple as severing the receive pin in an RS-232 cable to more complex techniques involving the use of optical cables or opto-isolator components that transfer electrical signals between two isolated circuits with light. An opto-isolator (also called an optocoupler) uses a optical emitter such as an LED that generates light responsive to electrical signals, while an optical sensor such as a phototransistor receives the light and converts the light into electrical signals. Because there is electrical isolation between the two sides of the opto-isolator, this physically enforces one-way communication across the opto-isolator.

However, because common Internet protocols depend upon two-way communication, a data diode requires additional components beyond an opto-isolator (or a simple serial cable with the receive line interrupted) to allow effective one-way communication.

Traditional data diodes are used to protect critical infrastructure, such as nuclear reactors or oil refineries by broadcasting equipment status in a one-way manner. These traditional data diodes are expensive and have required customization by skilled implementation teams.

SUMMARY OF INVENTION

In one aspect, a data diode, comprises a first network interface circuitry, comprising: a first processing element; an inbound communication interface, coupled to the first processing element; and a second network interface circuitry, comprising: a second processing element; and a wireless outbound communication interface, coupled to the second processing element; a single one-way data bridge coupled between the first processing element and the second processing element that allows data flow from the first processing element to the second processing element and physically prohibits data flow from the second processing element to the first processing element; a first firmware comprising instructions that when executed cause the first processing element to: automatically determine that a first protocol of a first predetermined plurality of protocols is used for communications via the inbound communication interface; and configure the first processing element to receive data using the first protocol and transmit the data across the one-way data bridge to the second processing element responsive to the determination; and a second firmware comprising instructions that when executed cause the second processing element to: automatically determine that a second protocol of a second predetermined plurality of protocols is used for communications via the outbound wireless communication interface; and configure the second processing element to transmit data received across the one-way data bridge by the second processing element using the second protocol, responsive to the determination, wherein the first protocol is different from the second protocol.

In a second aspect, a data diode, comprises a first network interface circuitry, comprising: a first processing element; a wireless inbound communication interface, coupled to the first processing element; and a second network interface circuitry, comprising: a second processing element; and an outbound communication interface, coupled to the second processing element; a single one-way data bridge coupled between the first processing element and the second processing element that allows data flow from the first processing element to the second processing element and physically prohibits data flow from the second processing element to the first processing element; a first firmware comprising instructions that when executed cause the first processing element to: automatically determine that a first protocol of a first predetermined plurality of protocols is used for communications via the inbound wireless communication interface; and configure the first processing element to receive data using the first protocol and transmit the data across the one-way data bridge to the second processing element responsive to the determination; and a second firmware comprising instructions that when executed cause the second processing element to: automatically determine that a second protocol of a second predetermined plurality of protocols is used for communications via the outbound communication interface; and configure the second processing element to transmit data received across the one-way data bridge by the second processing element using the second protocol, responsive to the determination, wherein the first protocol is different from the second protocol.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

Figure 1:
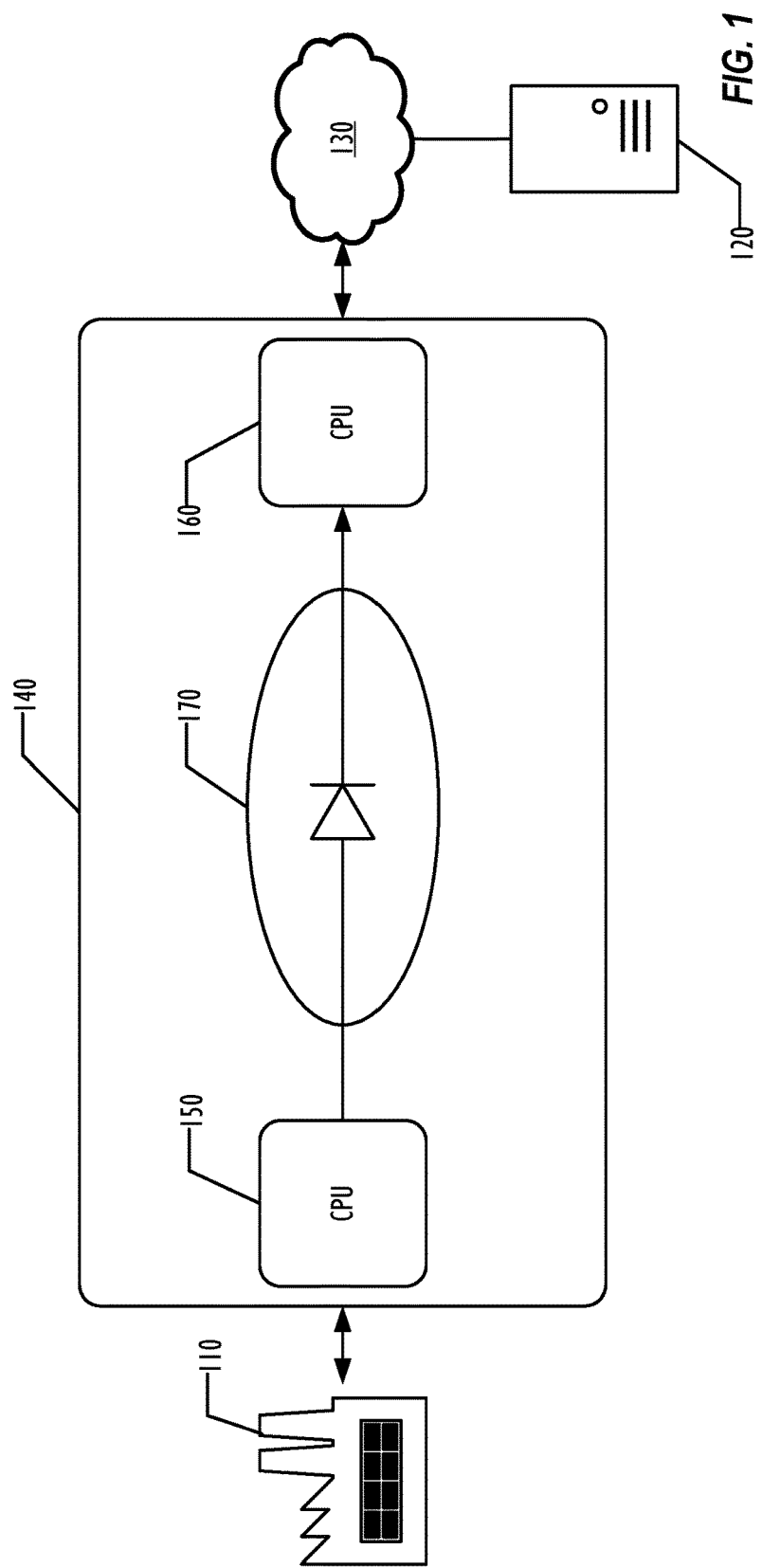
FIG. 1 is a high-level block diagram illustrating a data diode system according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts are understood to reference all instance of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments can implement the features and functionality described herein in software, firmware, or hardware as desired, including any combination of software, firmware, and hardware. References to daemons, drivers, engines, modules, or routines should not be considered as suggesting a limitation of the embodiment to any type of implementation.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one."

The term "or" means any of the alternatives and any combination of the alternatives, including all of the alternatives, unless the alternatives are explicitly indicated as mutually exclusive.

The phrase "at least one of" when combined with a list of items, means a single item from the list or any combination of items in the list. The phrase does not require all of the listed items unless explicitly so defined.

As used herein, the term "a computer system" can refer to a single computer or a plurality of computers working together to perform the function described as being performed on or by a computer system.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

As used herein, the term "processing element" can refer to a single hardware processing element or a plurality of hardware processing elements that together may be programmed to perform the indicated actions. The hardware processing elements may be implemented as virtual hardware processing elements of a virtual programmable device hosted on a physical hardware device. Instructions that when executed program the processing element to perform an action may program any or all of the processing elements to perform the indicated action. Where the processing element is one or more multi-core processors, instructions that when executed program the processing element to perform an action may program any or all of the multiple cores to perform the indicated action.

As used herein, the term "malware" can refer to any software used to disrupt operation of a programmable device, gather sensitive information, or gain access to private systems or networks. Malware includes computer viruses (including worms, Trojan horses, etc.), Bots, ransomware, spyware, adware, scareware, and any other type of malicious program.

As used herein, the term "medium" can refer to a single physical medium or a plurality of media that together store the information described as being stored on the medium.

As used herein, the term "memory" can refer to a single memory device or a plurality of memory devices that together store the information described as being stored on the medium. The memory may be any type of storage device, including random access memory, read-only memory, optical and electromechanical disk drives, etc.

FIG. 1 is a block diagram illustrating the use of a data diode according to one embodiment. In this example, a data source 110, such as a factory or other protected facility, is to provide data to a destination 120, such as a monitoring server. In some implementations, either or both of the source 110 and destination 120 may be directly connected to the data diode 140, or may be connected to the data diode 140 by one or more networks, such as the cloud network 130 illustrated FIG. 1. Although a single source 110 and a single destination 120 are illustrated in FIG. 1 for clarity of the drawing, the data diode 140 may support one-way communications from multiple sources 110 and multiple destinations 120 as desired. In the example illustrated in FIG. 1, the source is directly connected to the data diode 140 and connected to destination 120 that is a server connected via a cloud network 130; however, the data diode 140 may be connected at the source to any type of equipment, directly or indirectly, with or without an intervening network of any type. Similarly, the data diode 140 may be connected at the destination to any type of equipment, directly or indirectly, with or without an intervening network of any type.

Data diode 140 provides assurance that the data provided by source 110 is sent one-way only, physically preventing data from the destination 120 or elsewhere from reaching source 110. Data diode 140 generally comprises an onboard processing element 150 that communicates with source 110, an onboard processing element 160 that communicates with cloud 130, and a one-way coupler 170 that physically ensures that data passes only from processing element 150 to processing element 160, and not from processing element 160 to processing element 150. Processing elements 150 and 160 are programmed to allow the same data diode 140 to work with any of multiple protocols on either the source or destination side of the data diode, allowing a single model of the data diode 140 to be used in various environments without major configuration effort to accommodate various protocols.

Figure 2:
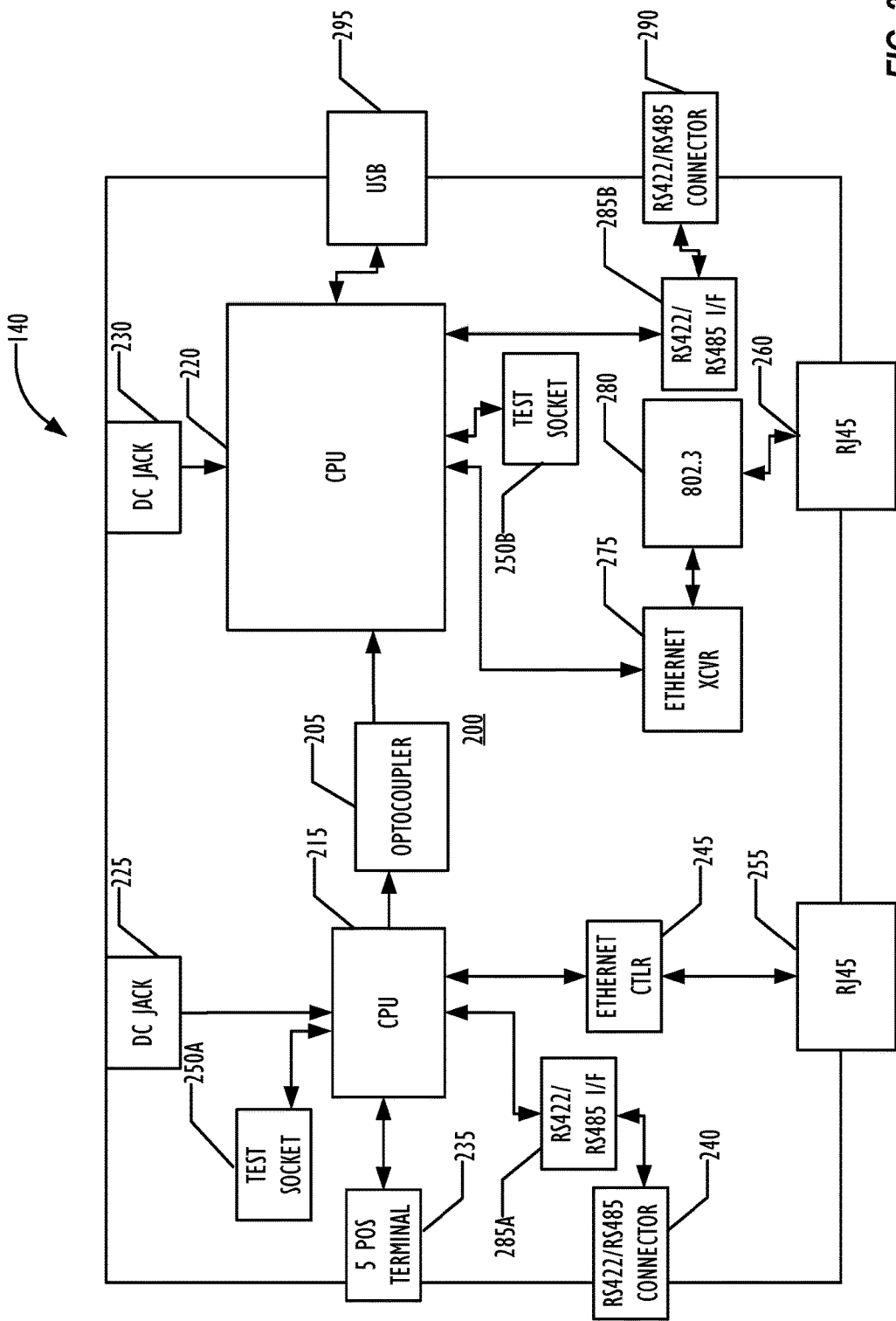
FIG. 2 is a block diagram illustrating components of a data diode according to one embodiment.

FIG. 2 is a block diagram illustrating an example layout of the components of data diode 140 according to one embodiment. In this figure, certain common elements have been omitted for clarity of the drawing, but one of skill in the art would understand that those elements would be present in operable embodiment. Connections are illustrated as logical connections between elements, and one of skill in the art would understand that connections between elements in the figure may involve multiple electrical traces instead of the single connector used to illustrate the connections between elements in the figure.

In one embodiment, a circuit board 200 may provide a base for mounting and connecting various components. Although identified as separate components by their function, one of skill in the art would understand that components illustrated as separate components may be combined into integrated components and that components illustrated as a single component may be split into separate components as desired.

The data diode 140 is comprised of two portions that communicate with each other in a one-way manner across one or more one way data bridges that enforce one-way communication. In some embodiments, photocouplers (also known as optocouplers or optical isolators) may be used for this purpose. In other embodiments, a laser and a photodetector may be used instead of an optocoupler. In other embodiments, an infrared transmitter and receiver may be used. In other embodiments, non-optical technique may be used, such as an audio speaker and a microphone may be used. In each case, the components provide the ability to enforce the one-way communication physically.

As illustrated in FIG. 2, a photocoupler 205 provides one-way data bridges between two processing elements 215, 220, with the photocoupler provided for communication from processing element 215 to processing element 220 Although illustrated as providing one-way communication from processing element 215 to processing element 220, other embodiments may configure the photocoupler 205 for one-way communication from processing element 220 to processing element 215.

No other electrical path connects processing elements 215 and 220. As illustrated in FIG. 2, each "side" of the data diode 140 may have its own power connection through power jacks 225, 230, typically DC power jacks. Although not shown in FIG. 2, in some embodiments each portion of the data diode 140 is implemented with separate grounding, further ensuring there is no path for data to traverse the data diode 140 in the reverse direction from the intended direction.

Processing elements 215, 220 may be any desired type of processing elements, including processors and microcontrollers. An example processing element may be an ARM® Cortex® processor from ARM Limited. (ARM and CORTEX are registered trademarks of ARM Limited.) Each of the processing elements 215, 220 must be powerful enough to perform protocol detection and conversion for a plurality of protocols. Each of processing elements 215 may be programmed with firmware code to perform protocol manipulation to allow the processing element 215, 220 to recognize a communication protocol used by the source 110 and destination 120, and process the communication in a way that successfully allows the one-way communication, even if either or both of the communication protocols used by the source 110 or destination 120 require two-way communication. In such a scenario, one or both of processing elements 215, 220 may communicate in a two-way communication with the source 110 or destination 120 to which the processing element 215, 220 is connected, acting as proxy while performing one way communication across the optocoupler 205 between processing elements 215 and 220. In some embodiments, the communication protocol used to communicate between processing elements 215 and 220 may differ from either or both of the communication protocols used by source 110 and destination 120. Preferably, the processing elements 215, 220 are programmed to recognize the communication protocols used by source 110 and destination 120 automatically, allowing the data diode 140 to be coupled between the source 110 and destination 120 without manual configuration by the user or with minimal configuration as desired. Processing elements 215, 220 may contain on-board memory for storing the firmware used for operating the processing elements 215, 220 in some embodiments. In other embodiments, off-chip memory components (not illustrated in FIG. 2) may be provided and coupled to the processing elements 215, 220.

As illustrated in FIG. 2, the data diode 140 provides a plurality of different type connectors, allowing the data diode 140 to be used in different types of connectivity environments without requiring different models of the data diode 140 that depend upon the desired type of connectivity. As illustrated in FIG. 2, the left side of the figure is configured as the source side for data transport and provides an RS422/RS485 connector 240, a 5 pin connector 235, and an RJ45 connector 255 for Ethernet connection between the processing element 215 and the source 110. Similarly, the right side of the figure is configured as the destination side for data transport and provides a USB connector 295, an RS422/485 connector 290, and an Rj45 connector for Ethernet connections between the processing element 215 and the source 110. In some scenarios, more and one of the connectors on either or both the source or destination portion of the data diode 140 may be operable at the same time. These connector types are illustrative and by way of example only, and other types of connectors may be used on either side of the data diode 140 in addition to or instead of the connectors illustrated in FIG. 2. In other embodiments, a single connector of any desired type may be provided on either side of the data diode 140, and different numbers and types of connectors may be provided on either side of the data diode 140 as desired.

Generally, there is two-way communication between any or all of the connectors 235, 240, and 255 and processing element 215, and between any or all of the connectors 295, 290, and 260 and processing element 220. As illustrated in FIG. 2, RS422/485 connector 240 is coupled to processing element 215 with RS422/RS485 interface 285A, while RS422/RS485 connector 290 is coupled to processing element 220 with RS422/RS485 interface 285B. In other embodiments, the processing elements 215, 220 may be capable of interfacing directly with RS422/RS485 connectors 240, 290 without an intermediary interface. As illustrated in FIG. 2, RJ45 connector 255 communicates with processing element 215 via Ethernet controller 245, while RJ45 connector 260 communicates with processing element 220 via IEEE 802.3 interface 80 and Ethernet transceiver 275. but other types of Ethernet coupling of the RJ45 connectors 255, 260 may be used.

In one embodiment, different components may be used for each "side" of the data diode 140. For example, RJ 45 connector 255 may be implemented in one embodiment with a RB1-125BAG1A connector manufactured by WIZnet, while RJ45 connector 260 may be implemented with a 2-406549-1 connector manufactured by TE Connectivity. In other embodiments, the same components may be used for both sides of the data diode 140.

In some embodiments, test sockets, such as test sockets 250A and 250B may be used for testing and debugging the hardware or firmware of the data diode 140. LEDs or other indicator devices may be included in the circuits of the data diode 140 to provide information for operation or debugging of the device. In some embodiments, the data diode 140 may include a display screen or a connector for a display screen to provide operational information. Similarly, embodiments of the data diode 140 may include an input device or a connector for an input device to allow information to be input into the device, such as for configuration purposes.

Each of processing elements 215 and 220 may include memory and firmware loaded into the memory for operation of the processing elements. The firmware comprises firmware to allow each of the processing elements 215 and 220 to act as a proxy for the source 110 or destination 120, and to manage the one-way communication between them even though either or both of source and destination 110, 120 communicate with the data diode 140 using two-way communication protocols.

In various embodiments, the firmware loaded into memory on the processing elements 215 and 220 for converting two-way communication to one-way communication may be implemented on one or both processing elements 215 and 220. Embodiments may include firmware that detects the protocol used by source 110 or destination 120 and loads an appropriate conversion firmware module to convert the protocol used by source 110 or destination 120 into a one-way protocol for communicating between the processing elements 215, 220. Communication between the processing elements 215, 220 may be performed according to a standard one-way communication protocol or may be performed in some embodiments using a non-standard one-way protocol specifically designed for the data diode 140. For example, processing element 215 may detect a connection to source 110 that uses a TCP protocol and convert the TCP protocol into a UDP protocol for communicating with the processing element 220, which may then reconvert the UDP protocol into a TCP protocol for communicating with destination 120.

In one embodiment processing elements 215, 220 are preprogrammed with a plurality of protocol detection and conversion modules, allowing the data diode 140 to be placed into operation in a variety of environment without the need for pre-configuration. In some embodiments, because of the presence of a plurality of types of connectors on both the input and output sides of the data diode 140, the data diode 140 can be used with a connector to the source 110 of one type and a connector to the destination 120 of a different type. In some embodiments, control firmware may sequence between a predefined set of pre-loaded control protocols, such as BACnet, LonTalk, Modbus, DNP3, etc.) and determine what variables may provided by the source 110, such as run time, system on/off status, temperature, fan speed, etc., and the processing element 215 or 220 may report those metrics across the optocoupler 205 at a predetermined interval or upon changes of the relevant metric. Similarly, in some embodiments, control firmware may sequence between a predefined set of pre-loaded control protocols for communicating with the destination. In some embodiments, one or more of processing elements 215 and 220 may encrypt the data received from the source 110 for delivery in encrypted form to destination 120, further enhancing the protection of the data from the source 110. Such encryption may be performed using any desired encryption technique, include symmetric and asymmetric encryption techniques.

In some embodiments, the source side processing element 215 or 220 may attempt to communicate using a preprogrammed sequence of queries until it has determined what protocols the source 110 uses and what variables the source 110 can report.

Although some embodiments may be implemented with a single circuit board 200 as illustrated in FIG. 2, embodiments may be implemented with two separate circuit boards that are connected by the optocoupler 205. The specific connectors and supporting interface circuits illustrated in FIG. 2 are illustrative and by way of example only, and other connectors and supporting interface circuits may be used. In some embodiments, some of the components illustrated as separate components in FIG. 2 may be combined into one or more integrated components and in some embodiments components illustrated in FIG. 2 may be split into multiple components that together perform the desired function. The arrangement of components on the circuit board 200 of FIG. 2 is illustrative and by way of example only, and other arrangements can be used as desired. For example, in the illustrated embodiment of FIG. 2, the connectors 235, 240, 255, 260, 295, and 290 are on various edges of the circuit board 200, but in some embodiments, all of the connectors may be disposed on a single edge of the circuit board 200.

Figure 3:
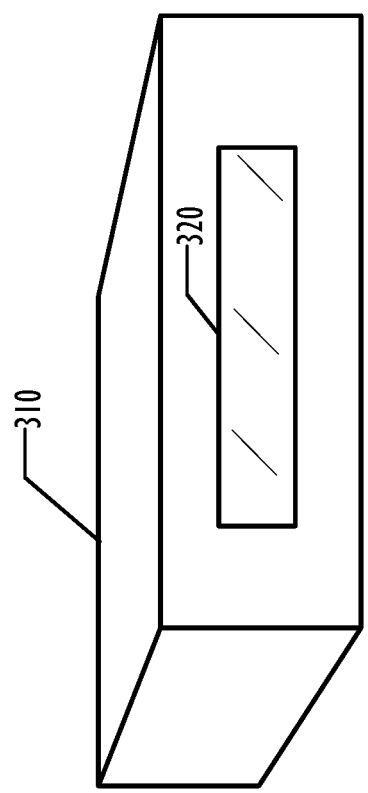
FIG. 3 is a perspective view of a housing for the data diode system according to one embodiment.

The circuit board 200 and the components disposed thereon are typically housed in a protective housing 310 as illustrated in FIG. 3, which may be of any desired shape and configuration. For example, the data diode 140 may be housed in a 1U form factor case for mounting in a standard rack. In some embodiments, a transparent window 320 may allow viewing LEDs or other indicators disposed on the circuit board 200 to indicate the state of the data diode 140. Some embodiments may provide a housing 310 that employs tamper-resistant techniques to prevent or detect tampering with the data diode 140. In some embodiments, a plurality of data diodes 140 may be housed in a common housing 310 to act as channels for separate communication paths, where a plurality of links are desired between a single source 110 and a single destination 120, a single source 110 and a plurality of destinations 120, a plurality of sources 110 and a single destination 120, or a plurality of sources 110 and a plurality of destinations 120.

Although preferably preconfigured to be plugged in and automatically activated, some embodiments may allow configuration of the data diode 140 at the installation site or elsewhere prior to operation. In some embodiments, the data diode 140 is not configurable on-site. In some embodiments, any type of wired or wireless connection technique may be used to connect the data diode 140 to another device, such as mobile device with an appropriate app, for in-field setup or management of the data diode 140 and for collecting information from the data diode 140 regarding its operation. A geolocation module (not shown in FIG. 2) may be incorporated in some embodiments to allow the data diode 140 to report its location as geolocation coordinates based on geolocation data from a global satellite-based navigation system or other geolocation data providers.

In some embodiments, the data diode 140 may be configured with reporting firmware to allow a cloud-based data collection, display, and analytics platform to collect usage data from the data diode 140 and allow a user to create custom alerts, detect tampering with the data diode 140, and receive recommended actions drawn from predictive analytics.

Figure 4:
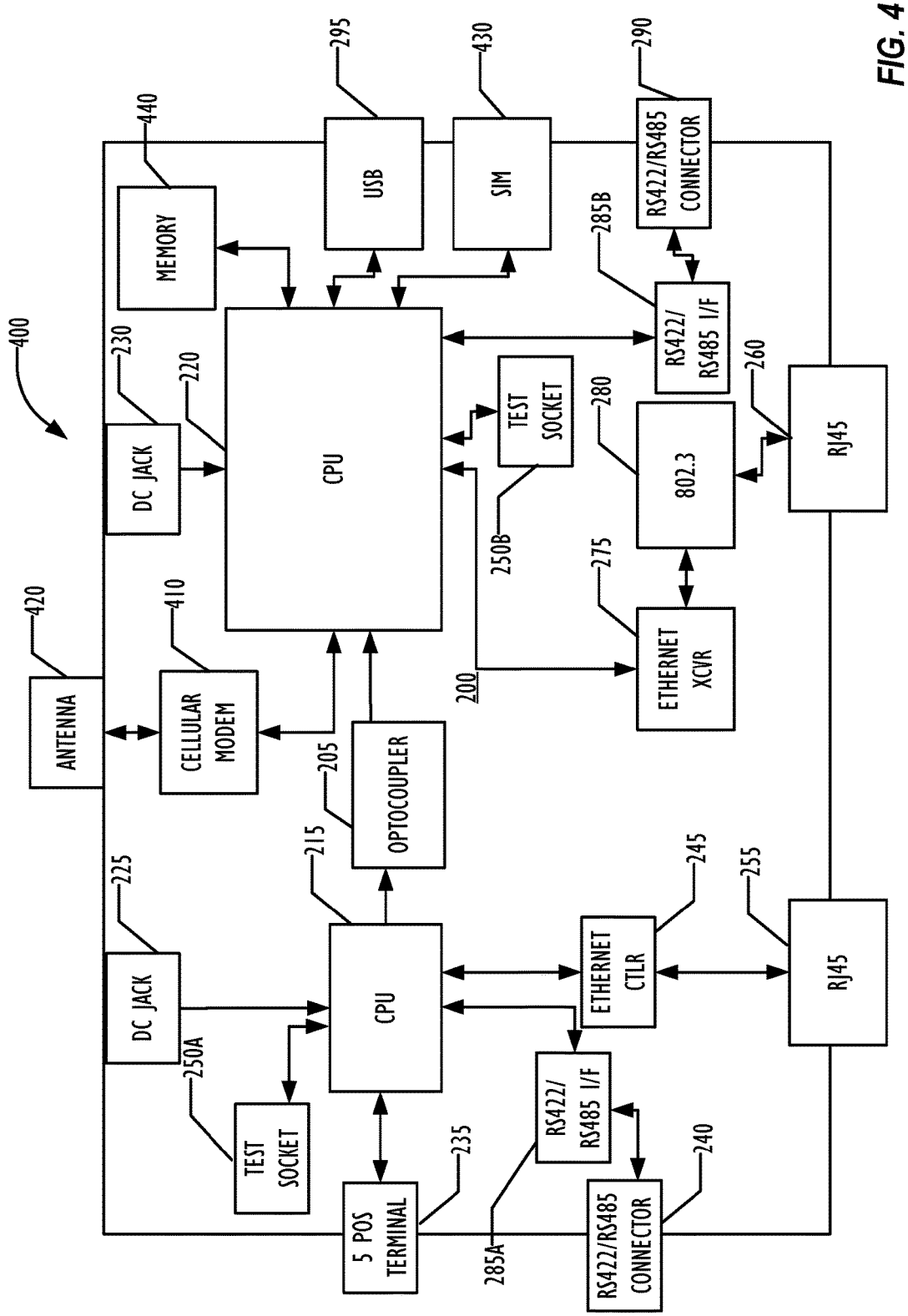
FIGS. 4-6 are block diagrams illustrating components of a data diode according to other embodiments.

FIG. 4 is a block diagram illustrating a data diode 400 according to another embodiment. As illustrated in FIG. 4, the circuit board 200 of the data diode 400 contains the elements of the data diode 140 of FIG. 2, but also allows for outbound connectivity via an outbound communication interface comprising a cellular modem 410 that uses an antenna 420 for communicating with a cellular network. Any type of cellular modem 410 and antenna 420 may be used. In one embodiment, the antenna 420 extends outward from the data diode 400; in other embodiments, the antenna 420 may be formed in the housing 300.

In some embodiments, a subscriber identification module (SIM) card reader 430 may allow configuring cellular communications by inserting a SIM card that stores an international mobile subscriber identity (IMSI) number and its related key, to identify and authenticate a subscriber of the cellular network. Although illustrated as a reader for a physical SIM card in FIG. 4, in other embodiments circuitry for processing virtual SIMs instead of or in addition to a physical SIM card reader may be used, such as a memory for storing an eSIM or other types of virtual SIMs that allow using a cellular network without having to use a physical SIM card.

In some embodiments, a memory 440 may be provided for caching or buffering communication via the cellular modem 410, to avoid problems that may be caused by variability of signals in the cellular network. Such variability may be caused by issues within the cellular network or may result from movement of the data diode 400 such as when installed in a vehicle, boat, railroad car, etc. that may be going in and out of cell phone coverage. The memory 440 can be of any desired size, such as 128 MB. In addition to caching or buffering communication data, the memory 440 may also be used for storing saving a last packet and status information if desired.

Although the data diode 400 of FIG. 4 is illustrated with both the memory 440 and SIM reader 430, either or both of those components may be omitted as desired.

As indicated in the discussion of FIG. 2, not all of the wired connectors and related components illustrated in FIG. 4 are required, and any of them may be omitted.

Figure 5:
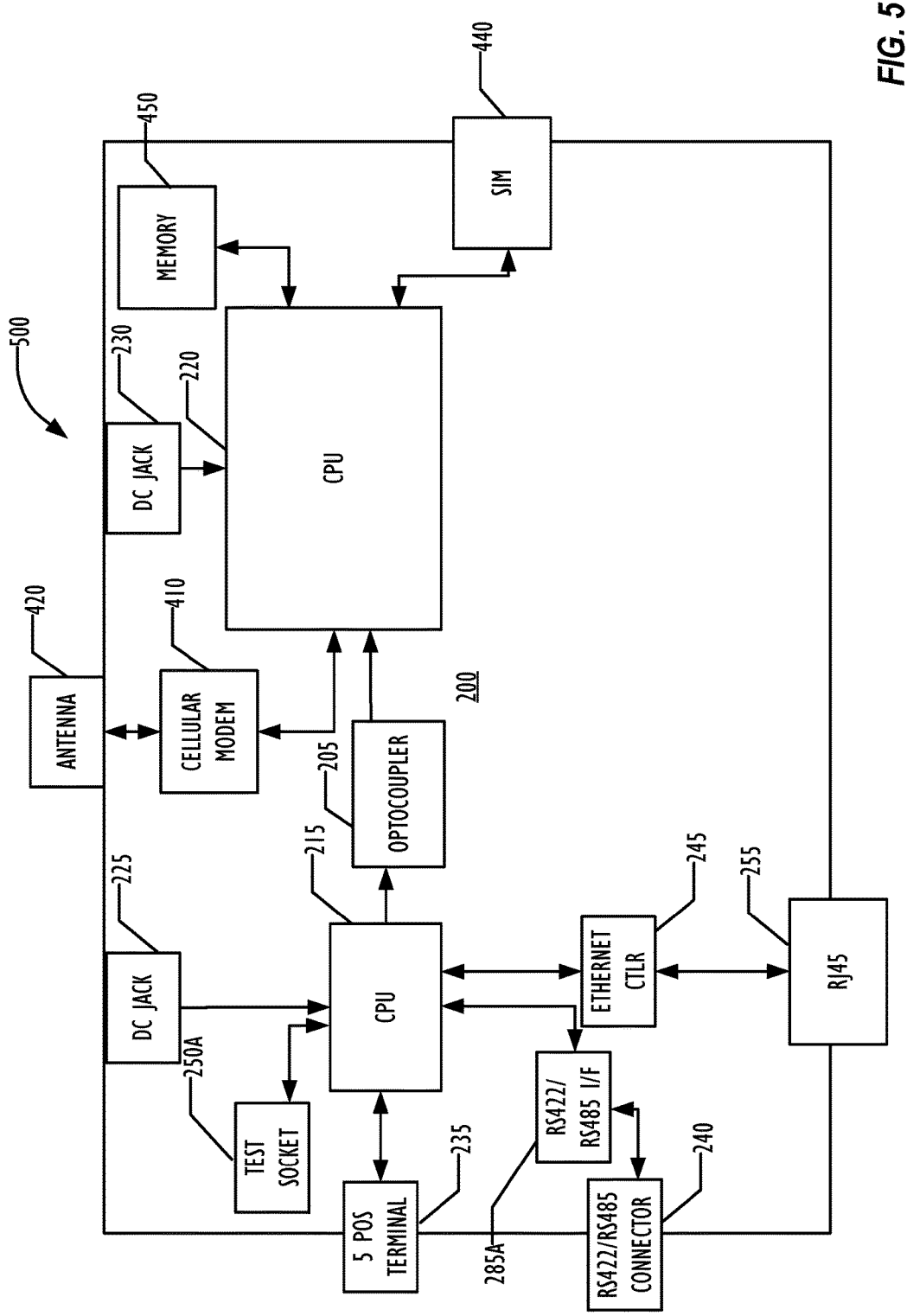

In FIG. 5, a block diagram of yet another embodiment illustrates a data diode 500 in which all of the outbound wired connectors of the data diode 140 of FIG. 2 and the data diode 400 of FIG. 4 are omitted, providing a communication interface that only provides cellular connectivity on the outbound side of the data diode 500 without the wired components and connectors illustrated in FIGS. 2 and 4.

Figure 6:
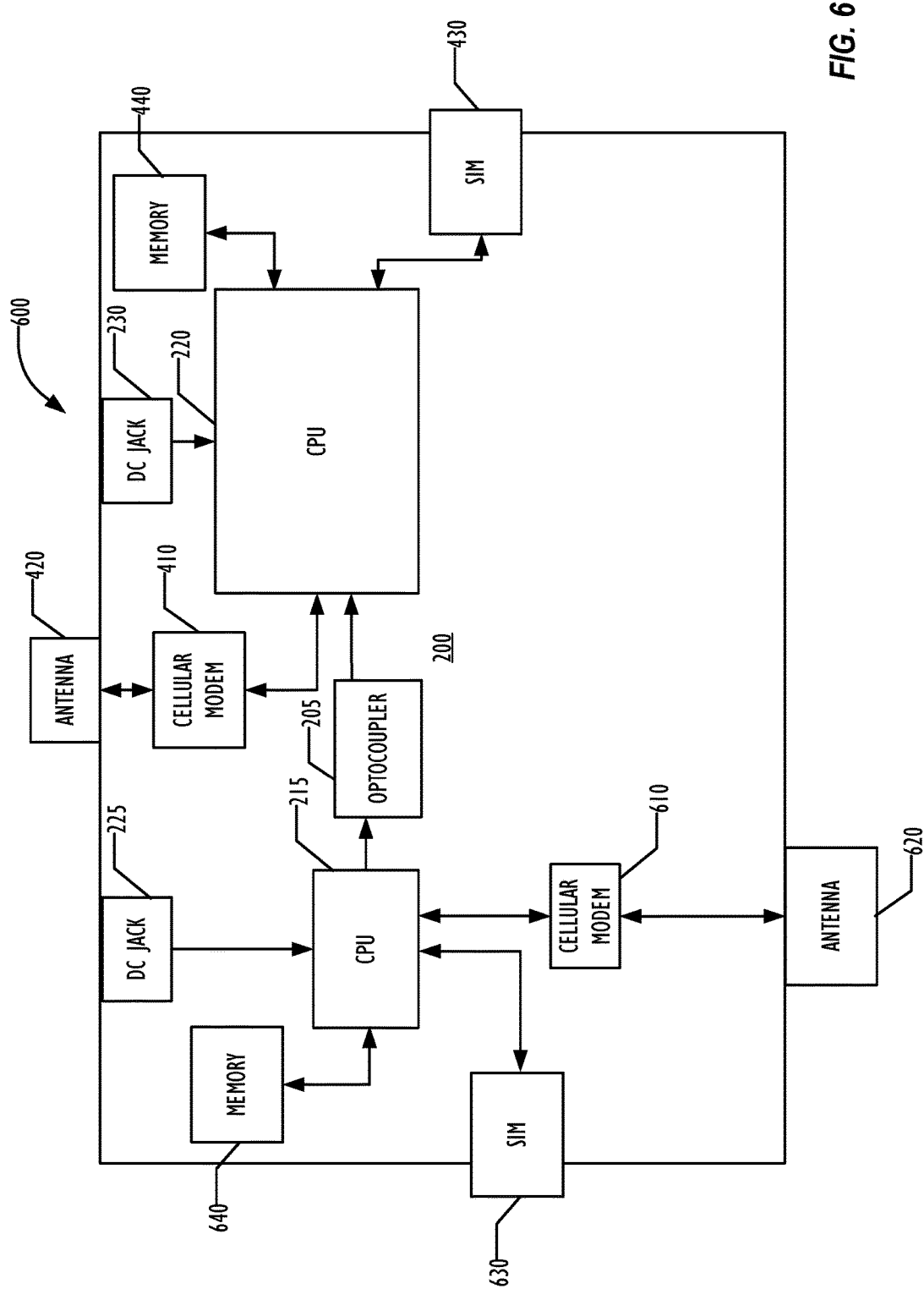

In FIG. 6, a block diagram of yet another embodiment illustrates a data diode 600 in which the inbound connectors of the inbound communication interface of the data diode 140, 400, 500 of FIGS. 2 and 4-5 are omitted. In this embodiment the inbound communication interface provides only cellular connectivity on the inbound side of the data diode 600, as well as an outbound communication interface with cellular connectivity. As on the outbound side, a cellular modem 610, which can be a different from the cellular modem 410, provides cellular communication via antenna 620, and may be configured by a SIM card inserted into SIM reader 630 and employ a memory 640.

In other embodiments, the inbound cellular components can be combined with the wired inbound components, similar to the embodiment illustrated in FIG. 4 for the outbound side. Thus, either or both the inbound and outbound sides of data diodes may employ cellular communication components in addition to or instead of wired components.

Although FIGS. 4-6 illustrate embodiments with inbound and outbound communication interfaces using cellular modems for communication with a data diode, other types of wireless communication components may be deployed in various embodiments allowing for non-cellular wireless communication with either or both the inbound and outbound side of the data diode 140, in addition to or instead of cellular or wired connectivity. For example, wireless components can be deployed for WI-FI®, Bluetooth®, LORA, satellite, ZIGBEE®, and Z-WAVE communications, and any other desired type of wireless communications. (WI-FI is a registered trademark of WiFi Alliance; Bluetooth is a registered trademark of Bluetooth SIG, Inc.; LORA is a registered trademark of Semtech Corporation; ZIGBEE is a registered trademark of ZigBee Alliance; Z-WAVE is a registered trademark of Silicon Laboratories, Inc.) Any combination of any of the wired or wireless (including cellular) communication techniques may be provided on either the inbound or outbound side of the data diode 140.

The above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

We claim:

1. A data diode, comprising:
    a first network interface circuitry, comprising:
        a first processing element;
        an inbound communication interface, coupled to the first processing element; and
    a second network interface circuitry, comprising:
        a second processing element; and
        a wireless outbound communication interface, coupled to the second processing element;
    a single one-way data bridge coupled between the first processing element and the second processing element that allows data flow from the first processing element to the second processing element and physically prohibits data flow from the second processing element to the first processing element;
a first firmware comprising instructions that when executed cause the first processing element to:
automatically determine that a first protocol of a first predetermined plurality of protocols is used for communications via the inbound communication interface; and
configure the first processing element to receive data using the first protocol and transmit the data across the one-way data bridge to the second processing element responsive to the determination; and
a second firmware comprising instructions that when executed cause the second processing element to:
automatically determine that a second protocol of a second predetermined plurality of protocols is used for communications via the outbound wireless communication interface; and
configure the second processing element to transmit data received across the one-way data bridge by the second processing element using the second protocol, responsive to the determination,
wherein the first protocol is different from the second protocol.

2. The data diode of claim 1, wherein the outbound wireless communication interface comprises:
an outbound cellular modem; and
an outbound antenna, coupled to the outbound cellular modem.

3. The data diode of claim 2, wherein the outbound wireless communication interface further comprises:
a subscriber identity module reader, coupled to the second processing element.

4. The data diode of claim 2, wherein the outbound wireless communication interface further comprises:
a memory, coupled to the second processing element,
wherein the second processing element is programmed to buffer outbound communications through the memory.

5. The data diode of claim 1, wherein the inbound communication interface comprises:
an inbound cellular modem; and
an inbound cellular antenna, coupled to the inbound cellular modem.

6. The data diode of claim 5, wherein the inbound communication interface further comprises:
a subscriber identity module reader, coupled to the first processing element.

7. The data diode of claim 5, wherein the inbound communication interface further comprises:
a memory, coupled to the first processing element,
wherein the first processing element is programmed to buffer inbound communications through the memory.

8. The data diode of claim 1, wherein the inbound communication interface is a wired communication interface.

9. The data diode of claim 1, wherein the second network interface circuitry further comprises an outbound wired communication interface, coupled to the second processing element.

10. The data diode of claim 9, wherein the second firmware further comprises instructions that when executed cause the second processing element to:
automatically determine that a third protocol of a third predetermined plurality of protocols is used for communications via the outbound wired communication interface; and
configure the second processing element to transmit data received across the one-way data bridge by the second processing element using the third protocol, responsive to the determination.

11. A data diode, comprising:
a first network interface circuitry, comprising:
a first processing element;
a wireless inbound communication interface, coupled to the first processing element; and
a second network interface circuitry, comprising:
a second processing element; and
an outbound communication interface, coupled to the second processing element;
a single one-way data bridge coupled between the first processing element and the second processing element that allows data flow from the first processing element to the second processing element and physically prohibits data flow from the second processing element to the first processing element;
a first firmware comprising instructions that when executed cause the first processing element to:
automatically determine that a first protocol of a first predetermined plurality of protocols is used for communications via the inbound wireless communication interface; and
configure the first processing element to receive data using the first protocol and transmit the data across the one-way data bridge to the second processing element responsive to the determination; and
a second firmware comprising instructions that when executed cause the second processing element to:
automatically determine that a second protocol of a second predetermined plurality of protocols is used for communications via the outbound communication interface; and
configure the second processing element to transmit data received across the one-way data bridge by the second processing element using the second protocol, responsive to the determination,
wherein the first protocol is different from the second protocol.

12. The data diode of claim 11, wherein the inbound wireless communication interface comprises:
an inbound cellular modem; and
an inbound antenna, coupled to the inbound cellular modem.

13. The data diode of claim 12, wherein the inbound wireless communication interface further comprises:
a subscriber identity module reader, coupled to the first processing element.

14. The data diode of claim 12, wherein the inbound wireless communication interface further comprises:
a memory, coupled to the second processing element,
wherein the first processing element is programmed to buffer inbound communications through the memory.

15. The data diode of claim 11, wherein the outbound communication interface comprises:
an outbound cellular modem; and
an outbound cellular antenna, coupled to the outbound cellular modem.

16. The data diode of claim 15, wherein the outbound communication interface further comprises:
a subscriber identity module reader, coupled to the second processing element.

17. The data diode of claim 15, wherein the outbound communication interface further comprises:
a memory, coupled to the second processing element, wherein the second processing element is programmed to buffer inbound communications through the memory.

18. The data diode of claim 11, wherein the outbound communication interface is a wired communication interface.

19. The data diode of claim 11, wherein the first network interface circuitry further comprises an inbound wired communication interface, coupled to the first processing element.

20. The data diode of claim 19, wherein the first firmware further comprises instructions that when executed cause the first processing element to:
  automatically determine that a third protocol of a third predetermined plurality of protocols is used for communications via the inbound wired communication interface; and
  configure the first processing element to transmit data received across the one-way data bridge by the first processing element using the third protocol, responsive to the determination.

\* \* \* \* \*